(12) United States Patent
Baer et al.

(10) Patent No.: US 7,241,117 B2
(45) Date of Patent: *Jul. 10, 2007

(54) MOTOR SHAFT ASSEMBLY AND METHOD

(75) Inventors: Mark E. Baer, Williamsport, PA (US); Melvin E. Wolfe, Jr., Hallstead, PA (US)

(73) Assignee: Shop Vac Corporation, Williamsport, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,794

(22) Filed: Apr. 6, 1999

(65) Prior Publication Data

US 2003/0188414 A1 Oct. 9, 2003

Related U.S. Application Data

(62) Division of application No. 09/174,499, filed on Oct. 16, 1998, now Pat. No. 6,035,515.

(51) Int. Cl.
 *F04B 17/00* (2006.01)
(52) U.S. Cl. .................................. 417/360; 417/423.15
(58) Field of Classification Search .................. 29/596, 29/898.07, 898.09; 464/88, 179; 403/374.3, 403/110, 370
 See application file for complete search history.

(56) References Cited

U.S. PATENT DOCUMENTS

| 320,392 A | 6/1885 | Peterson et al. |
| 1,023,272 A | 4/1912 | Oakes |
| 1,497,274 A * | 6/1924 | Hawley ................... 29/898.07 |
| 1,553,681 A | 9/1925 | Freitag |
| 1,725,390 A * | 4/1929 | Brouse |
| 1,879,081 A * | 9/1932 | Carpentier |
| 1,886,395 A | 11/1932 | Graul |
| 1,895,874 A | 1/1933 | Barbarou |
| 2,001,492 A | 5/1935 | Herrlinger ................. 29/156.8 |
| 2,174,010 A | 9/1939 | Patterson ....................... 64/11 |
| 2,179,730 A * | 11/1939 | Ruthman ..................... 415/98 |
| 2,195,749 A | 4/1940 | Lignian ..................... 29/149.5 |
| 2,248,405 A | 7/1941 | Freeman ......................... 286/5 |
| RE22,238 E * | 12/1942 | Clements .................... 417/363 |
| 2,469,116 A | 5/1949 | Kiekhaefer ................. 170/177 |
| 2,522,991 A | 9/1950 | Caserta ......................... 287/53 |
| 2,653,459 A | 9/1953 | Morrill ........................... 64/27 |
| 2,696,188 A | 12/1954 | Armstrong et al. ........... 115/18 |

(Continued)

FOREIGN PATENT DOCUMENTS

FR       1.165.543      * 10/1958     .................. 464/88

OTHER PUBLICATIONS

Merriam-Webster's Collegiate Dictionary, Tenth Edition, 1977, p. 5.*

*Primary Examiner*—Doris H. To
*Assistant Examiner*—Steve Blount
(74) *Attorney, Agent, or Firm*—Marshall, Gerstein & Borun LLP (57) ABSTRACT

A method for assembling a motor shaft with a bearing, a motor housing, and an impeller is disclosed. A motor shaft extension is used to retain the impeller axially on the motor shaft and allows the motor shaft to drive an additional component, such as an impeller, located a distance from the motor. The motor shaft extension may be fabricated from aluminum or hardened steel. Additionally, the motor shaft extension may be embodied in a tube extending past the end of the motor shaft and a shaft extension pressed into the end of the tube.

4 Claims, 6 Drawing Sheets

U.S. PATENT DOCUMENTS

| | | | |
|---|---|---|---|
| 2,801,593 A * | 8/1957 | Mosbacher | |
| 2,824,434 A | 2/1958 | Stern | 64/11 |
| 2,851,245 A | 9/1958 | Beale | 253/40 |
| 2,870,719 A * | 1/1959 | Murray et al. | |
| 2,926,542 A | 3/1960 | Schmitter et al. | 74/421 |
| 2,958,758 A | 11/1960 | Snell | 219/152 |
| 2,975,964 A * | 3/1961 | Osterkamp | |
| 3,037,455 A * | 6/1962 | Bozimowski et al. | |
| 3,037,458 A | 6/1962 | Olmstead et al. | 103/114 |
| 3,102,490 A | 9/1963 | Shiley | 103/87 |
| 3,213,642 A | 10/1965 | Stern et al. | 64/11 |
| 3,252,497 A * | 5/1966 | McGillis | 126/95 |
| 3,270,686 A * | 9/1966 | Thompson | |
| 3,285,187 A | 11/1966 | Anderson, Jr. | 103/115 |
| 3,365,758 A * | 1/1968 | Hansen | 24/391 |
| 3,395,552 A * | 8/1968 | Hauser | 464/88 |
| 3,423,957 A | 1/1969 | Palmer | 64/6 |
| 3,434,366 A * | 3/1969 | Raso et al. | |
| 3,440,836 A * | 4/1969 | Petersen | |
| 3,575,531 A * | 4/1971 | Buckingham | |
| 3,590,461 A | 7/1971 | Siler | 29/240 |
| 3,632,220 A | 1/1972 | Lansinger et al. | 415/112 |
| 3,665,758 A * | 5/1972 | Tiller | 73/862.381 |
| 3,734,548 A * | 5/1973 | Kieves | |
| 3,754,837 A | 8/1973 | Shimanckas | 416/93 |
| 3,829,957 A | 8/1974 | Pouch et al. | 29/445 |
| 3,871,324 A | 3/1975 | Snyder | 115/17 |
| 3,905,208 A | 9/1975 | Oyama et al. | 64/11 |
| 4,002,029 A * | 1/1977 | Jones | |
| 4,065,219 A | 12/1977 | Levine | 403/287 |
| 4,098,096 A * | 7/1978 | Chard et al. | |
| 4,102,601 A * | 7/1978 | Bischoff | 416/183 |
| 4,106,311 A * | 8/1978 | Euler | |
| 4,121,532 A * | 10/1978 | Coryell, III | 440/83 |
| 4,130,374 A * | 12/1978 | Bingler | |
| 4,147,470 A * | 4/1979 | Brooks et al. | 416/95 |
| 4,236,767 A | 12/1980 | Feldle | 308/187.1 |
| 4,289,445 A | 9/1981 | Sims | 415/113 |
| 4,299,319 A * | 11/1981 | Bochan | 192/103 B |
| 4,344,304 A * | 8/1982 | Eiche | |
| 4,406,465 A * | 9/1983 | Rockwood et al. | 277/348 |
| 4,462,148 A | 7/1984 | Joyce | 29/447 |
| 4,464,141 A | 8/1984 | Brown | |
| 4,498,874 A | 2/1985 | Pichl | 440/83 |
| 4,541,160 A * | 9/1985 | Roberts | |
| 4,574,448 A | 3/1986 | Brandenstein et al. | 29/283.5 |
| 4,623,277 A * | 11/1986 | Wayne et al. | |
| 4,655,684 A | 4/1987 | Haentjens | 415/170 |
| 4,676,714 A | 6/1987 | Fukazawa et al. | 415/72 |
| 4,709,794 A * | 12/1987 | Lengsfeld et al. | 192/18 B |
| 4,752,993 A | 6/1988 | Oaks | 29/21.1 |
| 4,799,855 A * | 1/1989 | Milocco et al. | |
| 4,822,241 A | 4/1989 | Jarvis et al. | |
| 4,832,674 A * | 5/1989 | Takemoto et al. | 474/166 |
| 4,852,230 A | 8/1989 | Yu | 29/148.4 |
| 4,863,406 A | 9/1989 | Bland et al. | 440/83 |
| 4,883,408 A | 11/1989 | Borcherding | 416/93 |
| 4,911,610 A * | 3/1990 | Olschewski et al. | |
| 4,919,562 A * | 4/1990 | Anthony et al. | |
| 4,955,786 A | 9/1990 | Kunkel et al. | 415/110 |
| 4,960,085 A * | 10/1990 | Coons | 123/179.31 |
| 5,131,782 A * | 7/1992 | Bruno et al. | 403/370 X |
| 5,133,123 A | 7/1992 | Rigg | 29/897.31 |
| 5,135,059 A * | 8/1992 | Turner et al. | |
| 5,141,392 A | 8/1992 | Uvemo | 415/121.1 |
| 5,195,880 A * | 3/1993 | Gruber | |
| 5,199,152 A | 4/1993 | Wagner | 29/444 |
| 5,207,561 A | 5/1993 | Godichon | 416/134 |
| 5,244,348 A | 9/1993 | Karls et al. | 416/204 |
| 5,272,930 A | 12/1993 | Nakamura et al. | 74/434 |
| 5,319,991 A * | 6/1994 | Pierrat | 74/89.32 |
| 5,330,284 A | 7/1994 | Persson | 403/370 |
| 5,356,237 A * | 10/1994 | Sung | 403/374.3 X |
| 5,370,587 A | 12/1994 | Johnson et al. | 474/166 |
| 5,378,124 A * | 1/1995 | Welch | |
| 5,386,630 A | 2/1995 | Fox | 29/898.09 |
| 5,489,187 A | 2/1996 | Ray | 415/111 |
| 5,535,517 A * | 7/1996 | Rode | 29/898.09 |
| 5,566,464 A | 10/1996 | Davis | 33/712 |
| 5,593,280 A | 1/1997 | Takada et al. | 416/44 |
| 5,716,279 A * | 2/1998 | Ham et al. | |
| 5,749,786 A * | 5/1998 | Pattok | |
| 5,779,385 A | 7/1998 | Fechter | |
| 5,921,695 A * | 7/1999 | Warner | 403/110 X |
| 5,967,751 A * | 10/1999 | Chen | 416/93 A |
| 6,079,958 A * | 6/2000 | Qandil | |
| 6,254,349 B1 * | 7/2001 | Haugen et al. | |
| 6,499,958 B2 * | 12/2002 | Haugen et al. | |
| 6,719,637 B1 * | 4/2004 | Greene | 464/182 |

* cited by examiner

MOTOR SHAFT ASSEMBLY AND METHOD

This is a Divisional of U.S. application Ser. No. 09/174,499, filed Oct. 16, 1998 now U.S. Pat. No. 6,035,515.

TECHNICAL FIELD

The present invention relates generally to motors, and more particularly to a method of assembling a motor and associated components such that the motor is capable of driving an apparatus located a significant distance from the motor.

BACKGROUND ART

In motor assembly situations, it is typically necessary to assemble a motor shaft within a motor housing. Additionally, it is often necessary to affix a component to the motor shaft after the motor shaft and the motor housing are assembled. In many applications, it is also necessary for a motor to drive an apparatus located a significant distance from the motor.

One method of assembling a motor shaft in a motor housing includes the step of installing a snap ring into a groove in the motor shaft. The snap ring serves as a retainer for a bearing that is pressed onto the motor shaft. The motor shaft and associated components are installed into the motor housing with one end of the shaft protruding from the housing. A barrel spacer is then fitted onto the shaft next to the bearing and protrudes from the motor housing. A first washer is slid onto the protruding end of the shaft and abuts the barrel spacer. In certain applications a component, such as an impeller, may also be slid onto the protruding end of the shaft into abutment with the first washer. A second washer is placed onto the motor shaft to sandwich the component between two washers. A hex nut is then threaded onto the end of the protruding shaft to hold all components on the shaft together in an axial direction against the snap ring. The threaded nut serves to apply pressure to the washers, which in turn hold the impeller to insure that the impeller rotates as the motor shaft rotates.

For applications where the motor is used to drive an apparatus located a significant distance from the motor, a shaft extension is typically threaded onto the end of the motor shaft. The shaft extension is coupled to the apparatus in any suitable manner.

The previously described method has disadvantages. When a motor having a long shaft is operated, torsional forces create shaft whip and wobble that create noise and vibration during motor operation, this problem is compounded when a threaded shaft extension is used. The installation of the threaded shaft extension onto the motor shaft often results in misalignment between the shaft extension and the motor shaft.

SUMMARY OF THE INVENTION

The present invention is embodied in a method of assembling a motor shaft with a motor component assembly. The method includes the steps of upsetting a portion of the motor shaft, inserting the motor component assembly, comprising a keyed spacer and a motor component onto the shaft, and pressing an extension onto the shaft into abutment with the motor component assembly.

The motor component assembly further includes a keyed washer disposed between the motor component and the extension.

The extension includes a tube that extends past the end of the motor shaft when a first end of the tube is in abutment with the motor component assembly.

The method of the present invention further includes the step of pressing a shaft extension into a second end of the tube.

In accordance with the present invention, the extension includes a metal shaft having a first bore to accommodate the motor shaft and a second bore.

The motor component includes an impeller.

According to another aspect of the present invention, a method of assembling a motor shaft with a motor component is disclosed. The method includes the steps of fitting a first end of a shaft extension into an end of the motor shaft, tightening a retainer onto the motor shaft, and installing a second end of the shaft extension into a lower assembly.

Other features and advantages of the present invention with become apparent from the attached specification and drawings.

DESCRIPTION OF THE PREFERRED EMBODIMENTS

Figure 1:
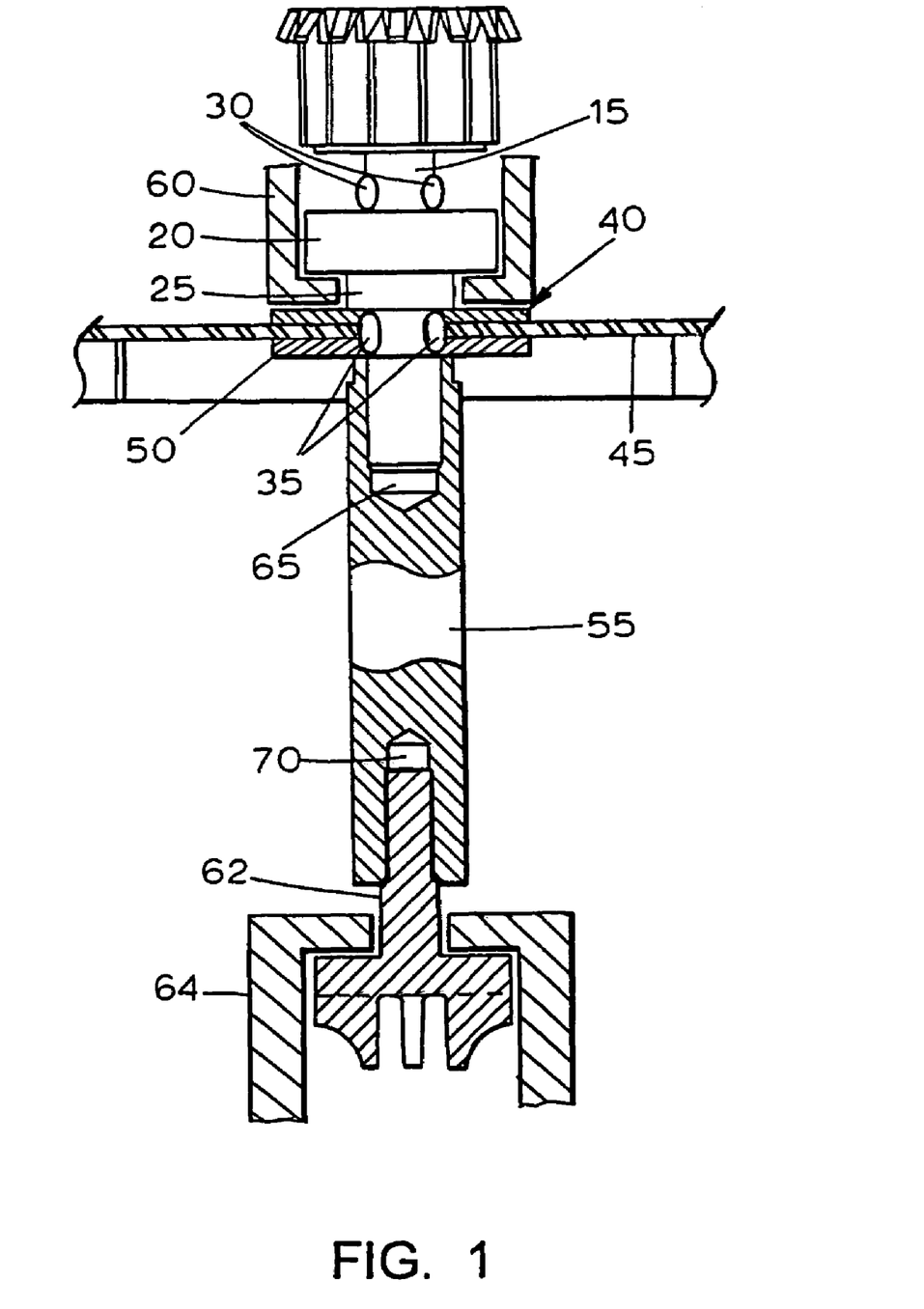
FIG. 1 comprises a fragmentary elevational view, partly in section, of a motor assembly assembled in accordance with one embodiment of the present invention.
Figure 2:
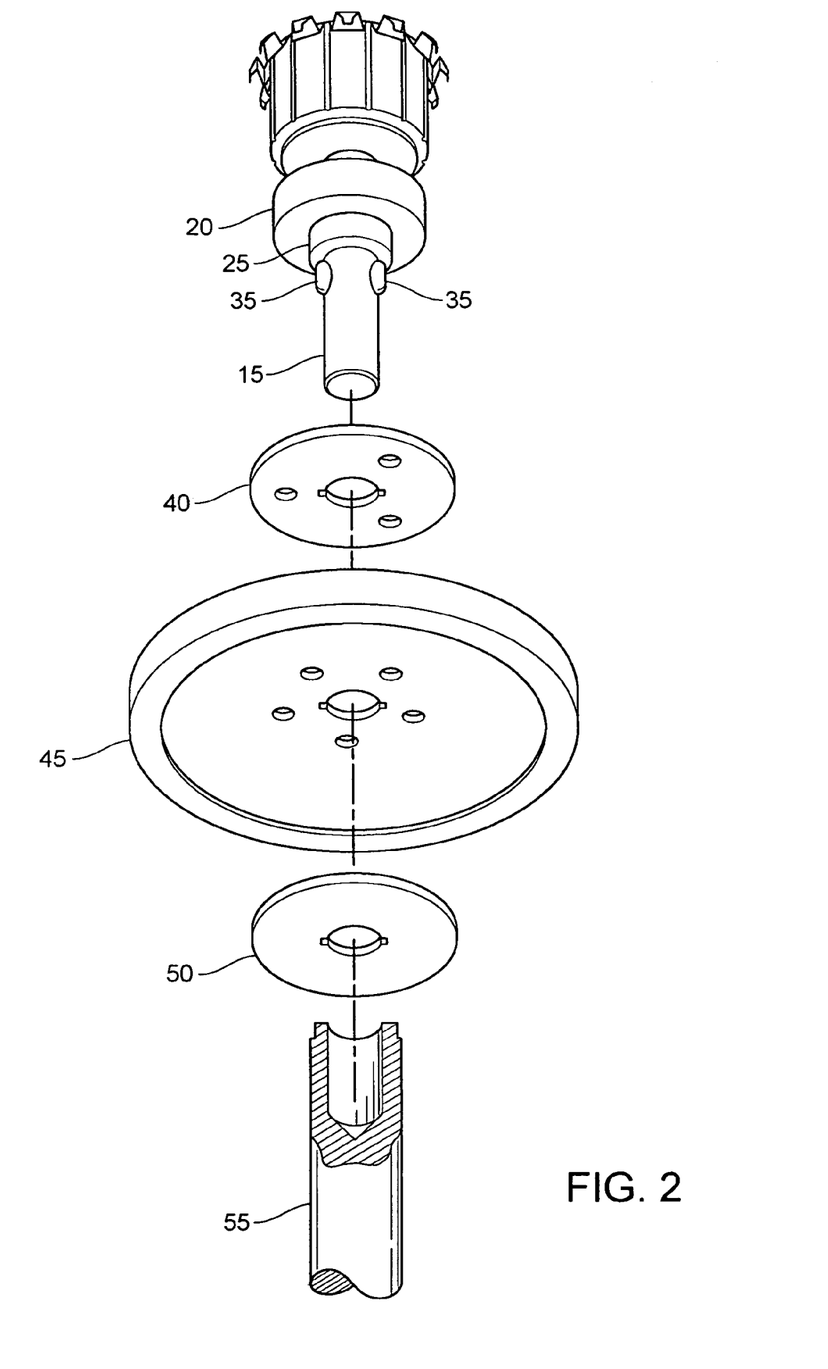
FIG. 2 comprises an exploded perspective view of the motor assembly of FIG. 1.

Referring now to FIGS. 1 and 2, a motor assembly 10 constructed using the method of the present invention is shown. The motor assembly 10 comprises a motor shaft 15, a bearing 20 and a spacer 25 disposed between first and second upset portions 30, 35, a drive washer 40, an impeller 45, a second washer 50, a motor shaft extension 55, and a motor housing 60. It should be noted that the impeller 45 may be replaced by any other suitable component. The motor assembly further comprises a second impeller 62 disposed within a housing 64. Alternatively, the second impeller 64 may be replaced with any suitable component.

After the first upset portion 30 is formed on the shaft 15, the bearing assembly 20 and the spacer 25 are pressed onto the shaft 15. The second upset portion 35 is created on the opposite side of the bearing assembly 20 and the spacer 25 as the first upset portion 30. The shaft 15 complete with first and second upset portions 30, 35, the bearing assembly 20 and the spacer 25 is inserted into the motor housing 60. Thereafter, the drive washer 40 having three lugs is placed onto the shaft 15, the lugs facing away from the motor housing. The drive washer 40 is keyed to fit over the second upset portion 35 and abuts the spacer 25, which in turn abuts the inner race of the bearing assembly 20. The impeller 45 having bores to accommodate the lugs on the drive washer 40 and keyways to accommodate the second upset portion 35 is placed on the shaft 15. The second washer 50 also keyed to accommodate the second upset portion 35 is installed onto the shaft 15. After the drive washer 40, the impeller 45, and the second washer 50 have been installed, the motor shaft extension 55 is installed into abutment with the second washer 50.

The motor shaft extension 55 is preferably fabricated from aluminum and comprises first and second bores 65, 70 in either end. The first bore 65 has a diameter slightly smaller than an outer diameter of the motor shaft 15, thereby allowing the motor shaft extension 55 to be pressed onto the motor shaft 15 and maintain an interference fit. When installed on the motor shaft 15, the motor shaft extension 55 is in abutment with the second washer 50, thereby holding all shaft components axially against the first upset portion 30.

The second bore 70 in the motor shaft extension 55 is sized to receive and create an interference fit with the second impeller 62, which is disposed within a housing 64. The motor shaft extension 55 performs the function of transferring torque from the motor shaft 15 to the impeller 62, in addition to axially retaining the motor components on the motor shaft 15. The motor shaft extension 55 provides a stiff shaft in situations where a long shaft is required. Because the motor shaft extension is stiff, shaft whip and wobble are eliminated. Although the motor shaft extension 55 is preferably fabricated from aluminum, it may be fabricated from steel, plastic, fiberglass or any other suitable material.

Figure 3:
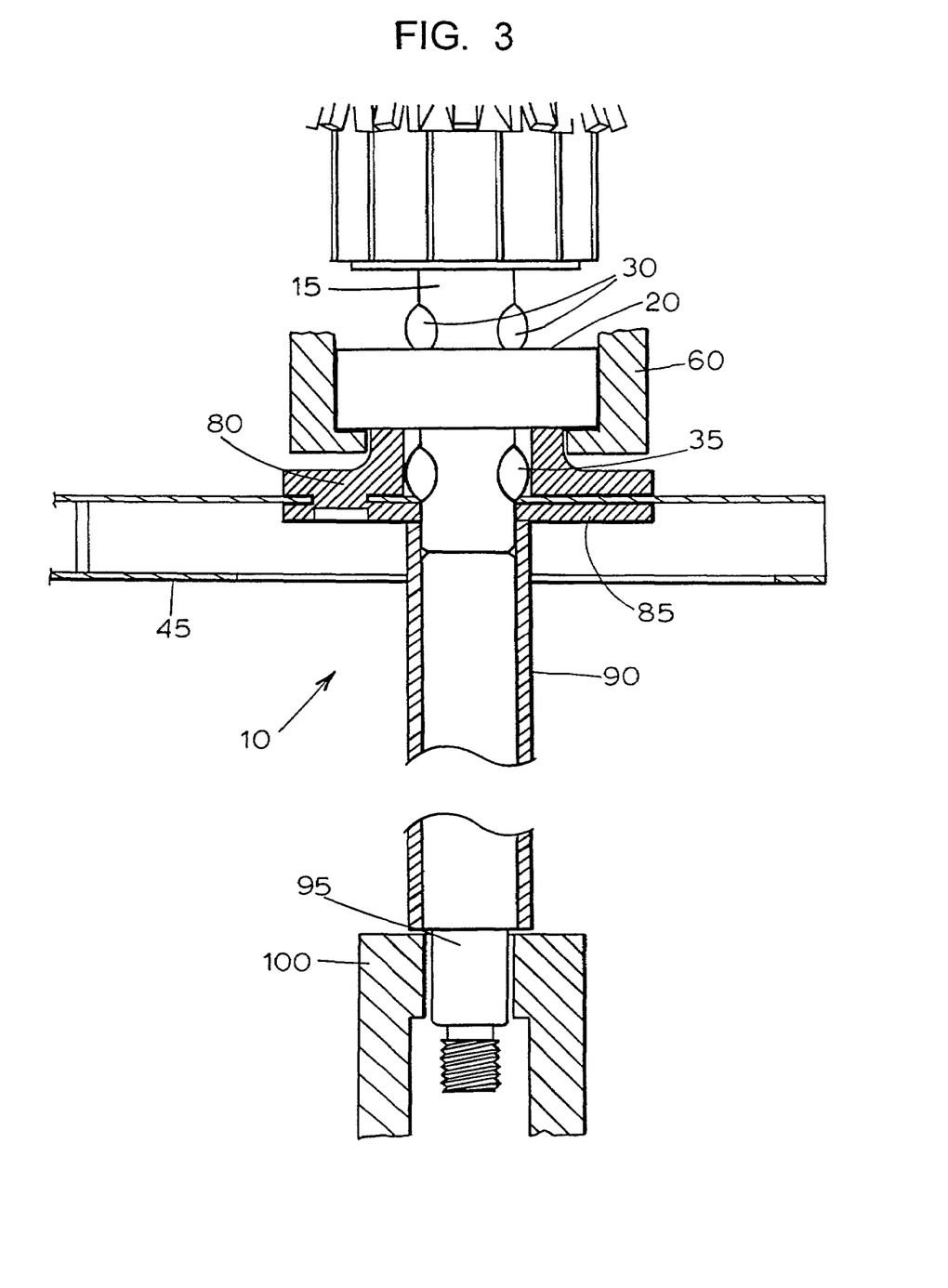
FIG. 3 comprises a fragmentary elevational view, partly in section, of a motor assembly comprising a tube coupling an extension onto the motor shaft.

An alternate embodiment of the present invention is shown in FIG. 3. The assembly comprises a motor shaft 15, a bearing assembly 20 disposed between a first upset portion 30 and a second upset portion 35, an impeller 45, a motor housing 60, a drive spacer 80, a keyed washer 85, a tube 90, and a shaft extension 95. It should be noted that the impeller 45 may be replaced by any other suitable component.

After the first upset portion 30 is formed on the shaft 15, the bearing assembly 20 is pressed onto the shaft 15. A second upset portion 35 is created on the opposite side of the bearing assembly 20 from the first upset portion 30. The shaft 15 complete with first and second upset portions 30, 35 and the bearing assembly 20 is then inserted into the motor housing 60. Thereafter, a drive spacer 80 having three lugs is placed onto the shaft 15, the lugs facing away from the motor housing 60. The drive spacer 80 is keyed to fit over the second upset portion 35, and extends into the motor housing 60 abutting the inner race of the bearing assembly 20. The impeller 45 has bores to accommodate the lugs on the drive spacer 80 and is placed on the shaft 15. A washer 85 also having bores to accommodate the drive spacer 80 lugs is installed onto the shaft 15. After the drive spacer 80, the impeller 45, and the washer 85 have been installed, a tube 90 is installed into abutment with the washer 85. The tube 90 may be fabricated from aluminum, fiberglass, steel or any other suitable material and has an inner diameter slightly smaller than an outer diameter of the shaft 15 to form an interference fit, which holds the drive spacer 80, the shaft component 45, and the washer 85 in place. The installation of the tube 90 not only holds the shaft components in place as noted, but provides a receptacle into which the shaft extension 95 may be pressed.

The shaft extension 95 may be provided to couple torque from the motor shaft 15 to another component such as a pump impeller (not shown), which may be threaded onto the shaft extension 95 and disposed within a housing 100. The housing 100 may be located a distance from the end of the motor shaft 15. The tube 98 in conjunction with the shaft extension 95 provides a long stiff shaft, thereby eliminating shaft whip and wobble, and its associated noise, during motor operation.

Figure 4:
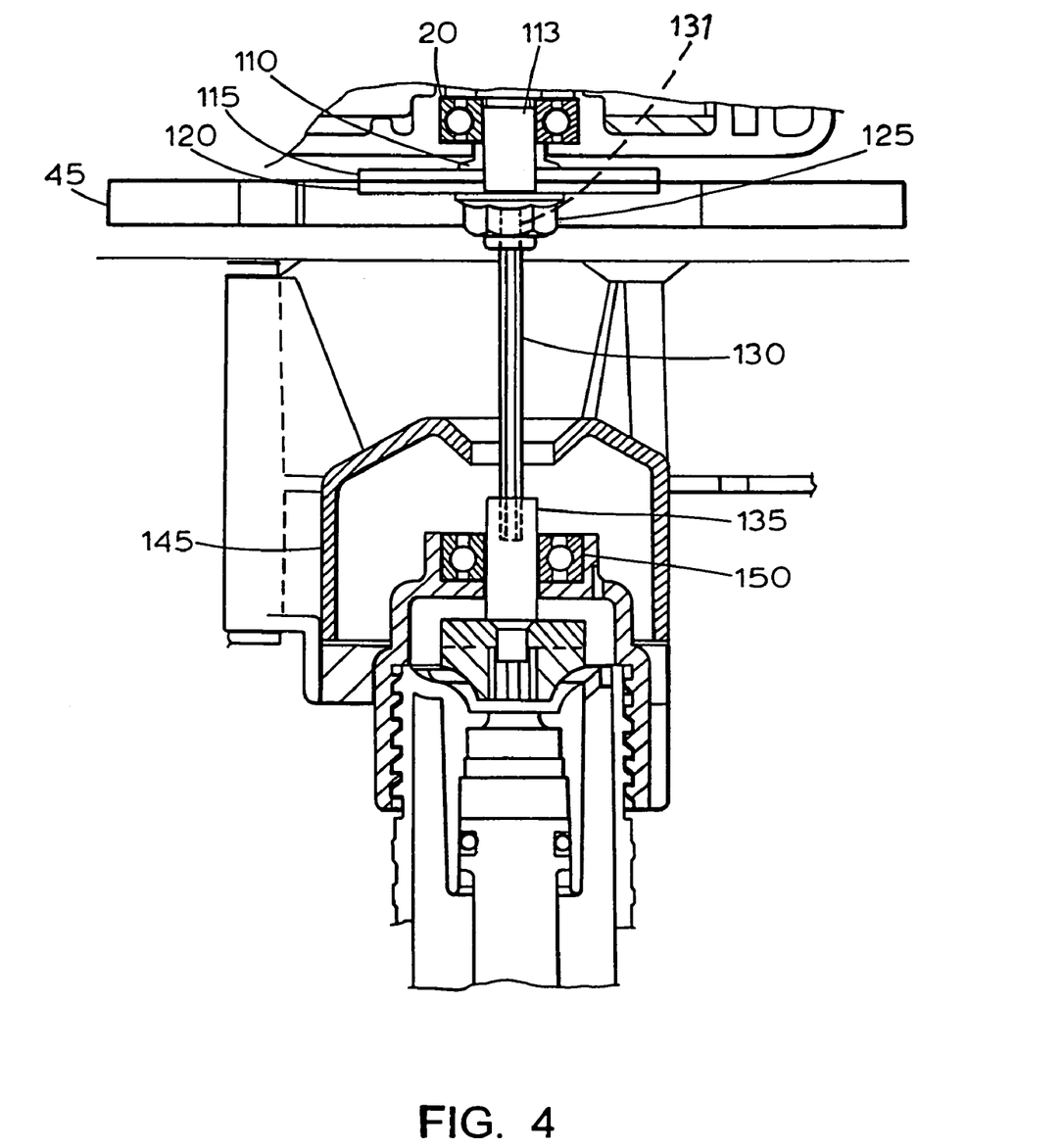
FIG. 4 comprises a fragmentary elevational view, partly in section, of an alternate embodiment of a motor assembly comprising a retaining nut and a hexagonal shaft extension.

In another alternative embodiment, such as shown in FIG. 4, a spacer 110 may be installed on the motor shaft 113 into abutment with the inner race of the bearing assembly 20. Conventional flat washers 115, 120 are placed on either side of the impeller 45. A hex nut 125 is threaded onto the end of the motor shaft 113 to retain the washer 115, 120, the impeller 45, and the spacer 110 axially onto the shaft 113.

The end of motor shaft 113 is machined with a compartment 131 to receive a shaft extension 130. The shaft extension 130 is preferably machined from steel and has a hexagonal perimeter. The shaft extension 130 is preferably hardened. An aluminum fitting 135 is pressed onto an end of the shaft extension 130 that is not received by the motor shaft 113.

Typically, the shaft extension 130 is used to transfer torque from the motor shaft 113 to a driven component 145, which may be embodied in a pump impeller assembly. The driven component 145 preferably comprises a lower bearing assembly 150, which receives the aluminum fitting 135 that is pressed onto the shaft extension 130. The lower bearing assembly 150 is preferably a roller ball type assembly, which stabilizes the motor shaft extension 130 during motor operation.

Figure 5:
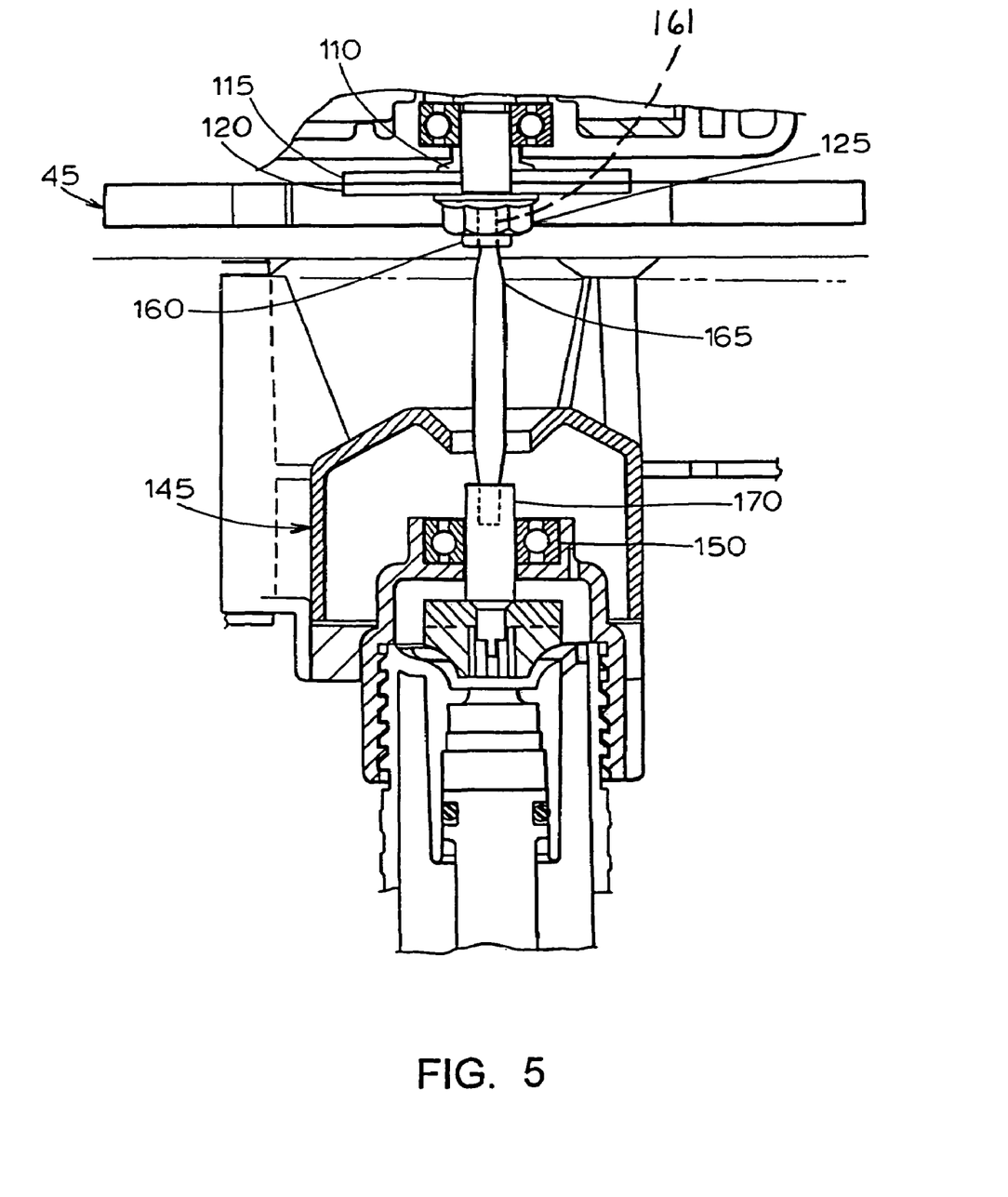
FIG. 5 comprises a fragmentary elevational view, partly in section, of an alternate embodiment of a motor assembly comprising retaining nut and a flexible shaft.

Alternatively, the embodiment of the present invention shown in FIG. 4 may be modified as shown in FIG. 5. That is, the shaft 113, the shaft extension 130, and the fitting 135 shown in FIG. 4 may be changed. Specifically, as shown in FIG. 5, the motor shaft 160 may be machined to comprise a square compartment 161 for receiving a first end of a square shaft extension 165, which fits loosely into the end of the motor shaft 160. A fitting 170 may be pressed into a bearing assembly 150, and may receive a second end of the square shaft extension 165. The fitting 170 and the square shaft extension 165 fit together loosely to tolerate a slight misalignment between the motor shaft 160 and the driven component 145.

Preferably, the square shaft extension 165 is fabricated from flexible steel. However, alternatively, the square shaft extension may be fabricated from any other material having similar hardness and flexibility characteristics as steel. Preferably, the fitting 170 is fabricated from aluminum; however, any other suitable material may be substituted.

Figure 6:
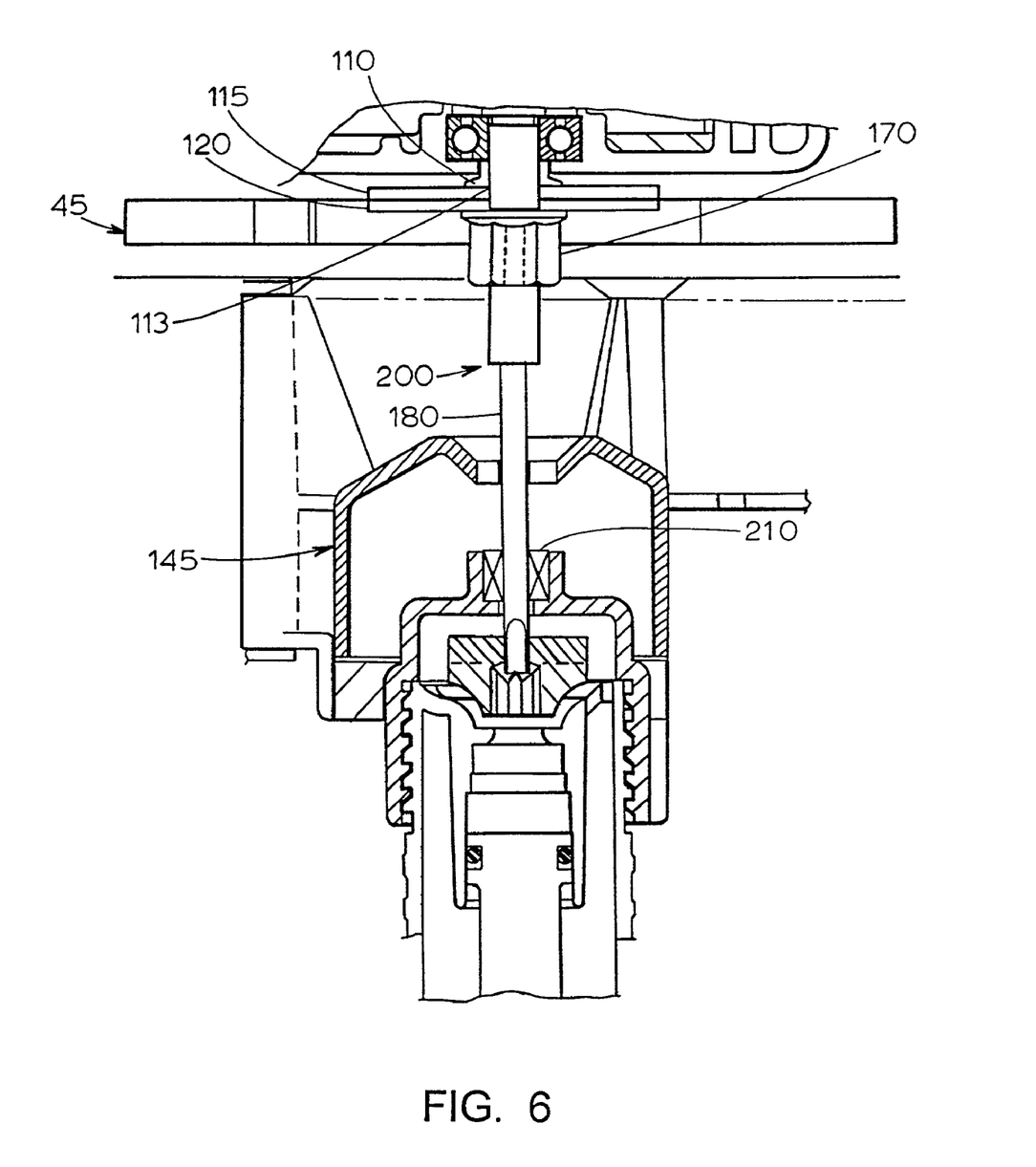
FIG. 6 comprises a fragmentary elevational view, partly in section, of an alternate embodiment of a motor assembly comprising a retaining nut attached to a flexible shaft extension.

FIG. 6 illustrates another embodiment of the present invention, which is similar to the embodiment shown in FIG. 5. Just as in the embodiment shown in FIGS. 4 and 5, FIG. 6 includes a spacer 110, flat washers 115, 120, and a threaded shaft 113. Also included in the embodiment shown in FIG. 6 is a hex nut 170 crimped to a flexible steel shaft 180 extension to form an extension assembly 200. During installation the steel shaft 180 is fitted into the end of the motor shaft 113 and the hex nut 170 is threaded onto the motor shaft 113, thereby retaining the steel shaft 180 to the motor shaft 113.

The steel shaft 180 is slip fitted into a bearing 210 of a driven component 145. The bearing 210 preferably comprises a powdered metal bearing.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

The invention claimed is:

1. A motor assembly for use with a pump, the assembly comprising:
   a motor shaft that has a first end with a first surface geometry with an eccentric cross sectional configuration;
   a fan impeller that is installed on the motor shaft proximate the first end of the motor shaft;
   a first washer that is disposed on a side of the fan impeller that is away from the first end of the motor shaft;
   a second washer that is disposed on a side of the fan impeller that is toward the first end of the motor shaft;
   a shaft extension that has a first end with a second surface geometry with a non-circular cross section and is coupled to the first surface geometry of the first end of the motor shaft; and
   a pump impeller assembly that is coupled to the shaft extension and includes a lower bearing assembly that receives a fitting that is pressed onto the shaft extension.

2. A motor assembly as recited in claim 1, in which the cross section of the first surface geometry is hexagonal.

3. A motor assembly as recited in claim 1, in which the cross section of the first surface geometry is square.

4. A motor assembly as recited in claim 1, in which the first surface geometry defines a compartment within the motor shaft.

* * * * *